United States Patent [19]

Futhey

[11] Patent Number: 5,285,314

[45] Date of Patent: * Feb. 8, 1994

[54] SUPERZONE HOLOGRAPHIC MIRROR

[75] Inventor: John A. Futhey, Petaluma, Calif.

[73] Assignee: Minnesota Mining and Manufacturing Company, Saint Paul, Minn.

[ * ] Notice: The portion of the term of this patent subsequent to Jun. 26, 2007 has been disclaimed.

[21] Appl. No.: 995,339

[22] Filed: Dec. 22, 1992

Related U.S. Application Data

[63] Continuation of Ser. No. 695,269, May 3, 1991, abandoned.

[51] Int. Cl.$^5$ .......................... G02B 5/18; G02B 27/44
[52] U.S. Cl. .................................... 359/565; 359/570; 359/572; 359/574
[58] Field of Search ................ 359/565, 570, 571, 572, 359/574, 575, 576, 566, 569

[56] References Cited

U.S. PATENT DOCUMENTS

| | | | |
|---|---|---|---|
| 4,210,391 | 7/1980 | Cohen | 359/565 |
| 4,338,005 | 7/1982 | Cohen | 351/161 |
| 4,340,283 | 7/1982 | Cohen | 351/161 |
| 4,846,552 | 7/1989 | Veldkamp et al. | 359/572 |
| 4,881,805 | 11/1989 | Cohen | 359/571 |
| 4,886,341 | 12/1989 | Oishi et al. | 359/572 |
| 4,936,665 | 6/1990 | Whitney | 359/565 |
| 4,936,666 | 6/1990 | Futhey | 350/452 |
| 5,016,977 | 5/1991 | Baude et al. | 359/571 |
| 5,017,000 | 5/1991 | Cohen | 359/572 |
| 5,058,981 | 10/1991 | Umegaki et al. | 359/565 |
| 5,074,646 | 12/1991 | Huang et al. | 359/572 |

OTHER PUBLICATIONS

A. Walsh, "Echelette Zone Plates for Use in Far Infrared Spectroscopy," *Journal of the Optical Society of America*, Mar. 1952, p. 213.

*Primary Examiner*—Martin Lerner
*Attorney, Agent, or Firm*—Gary L. Griswold; Walter N. Kirn; Stephen W. Buckingham

[57] ABSTRACT

A diffractive mirror has a plurality of diffractive zones at least one of which has an optical step having a height equal to $j\lambda/2$ and at least one of which has an optical step having a height equal to $k\lambda/2$ where $\lambda$ is a design wavelength of the mirror and j and k are unequal nonzero integers. Alternatively stated at least one of the optical steps induces a relative phase shift of $2j\pi$ at the image point between two light rays emerging from a point source at the object point and striking the lens immediately on opposite sides of the step and at least one of the steps induces a relative phase shift of $2k\pi$ at the image point between two light rays emerging from a point source at the object point and striking the lens immediately on opposite sides of that step.

38 Claims, 3 Drawing Sheets

SUPERZONE HOLOGRAPHIC MIRROR

This is a continuation of application Ser. No. 07/695,269 filed May 3, 1991, now abandoned.

BACKGROUND OF THE INVENTION

Optical devices utilizing diffraction are well-known in the art. Such devices are often known as holographic elements. The most common holographic elements are transmissive to light. In such devices light receives a phase shift that is dependent upon the region of the device through which it travels. By carefully controlling the relative amounts of phase shift provided by different regions of the device, the diffractive properties may be controlled. An example of a transmissive diffractive element is a kinoform.

Although less common than transmissive diffractive elements, reflective diffractive elements are also known. For example, such a device is described in "Etchelette Zone Plates for Use in Far Infrared Spectroscopy" by A. Walsh, *Journal of the Optical Society of America*, March 1952, p. 213. Reflective diffractive systems are used primarily in situations where space limitations prevent the use of a conventional spheric or parabolic reflector. The alternative to a diffractive optical element in such a situation would be a conventional Fresnel-type reflector. If a precise focus is required, however, the Fresnel-type reflector will not provide adequate performance. This is because the presence of repeated Fresnel prisms will create diffractive effects, but without the precisely-controlled phase relationships of an element intentionally employing diffraction. The result is that the focus will be unacceptably diffuse. Alternatively a reflector intentionally employing diffraction can bring monochromatic light to a comparatively precise focus.

Another possible, although less common, use for a diffractive reflector arises when chromatic dispersion is desired in the image. Since conventional reflectors are achromatic, diffractive power is required to provide such dispersion.

A conventional diffractive reflector will have a series of linear or circular diffractive zones. These zones radiate outward from a central zone. For simplicity, such a device with circular zones will be described. Such a reflector has performance that corresponds approximately to that of a spherical mirror. Linear zones, providing performance that corresponds to a cylindrical reflector, or zones of arbitrary shape, will be understood by analogy.

In order to design a diffractive reflector, an object distance ($D_o$) and an image distance ($D_i$) are selected. The reflector will be designed such that light emanating from a point source, usually on the optical axis of the reflector, a distance equal to the object distance away from the reflector, will be brought to a point focus at a point also usually on the optical axis a distance away from the reflector equal to the image distance. In order to do so a series of concentric diffractive zones are formed on the surface of the reflector. The radii of the zones are given by the equation.

$$r_n = \sqrt{r_0^2 + 2n\lambda f + n^2\lambda^2/4}$$

where n is the number of the zone counting from the center and the central is zone 0, $r_o$ is the radius of the central zone and $\lambda$ is the preselected design wavelength of the lens. The parameter f is equal to the reciprocal of the sum of the reciprocals of the object and image distances, i.e.

$$f = \frac{1}{\frac{1}{D_o} + \frac{1}{D_i}}$$

The diffractive zones are separated from one another by optical steps. The optical steps should be of a size such that, for light emerging from the object point, a ray of light striking immediately on one side of an optical step will be phase shifted by one wavelength at the image point with respect to a ray of light falling immediately on the other side of the optical step. In general, optical steps equal to one half of the design wavelength will accomplish this. It should be noted, however, that, for wide apertures, trigonometric effects will require that the step heights be smaller.

Preferably each zone has a contour such that light starting from the object point, striking the reflector and arriving at the image point will have the same phase regardless of where the ray of light strikes the reflector within the zone, although some approximations are possible.

When the ratio of the parameter f to the aperture of the mirror is large, problems arise due to the size of the outer zones. First it is difficult to manufacture such zones because they become very narrow. Furthermore some scattering will occur from each of the discontinuities. Since the zones are very narrow in the outer region, there are more peaks in a given distance and, therefore, more scattering.

SUMMARY OF THE INVENTION

In the invention, a mirror has diffractive power produced by diffractive zones. The zones are terminated by optical steps. A first group of zones has optical steps having heights equal to $j\lambda/2$ and a second group of zones has optical steps having heights equal to $k\lambda/2$ where $\lambda$ is a design wavelength of light of the lens and j and k are unequal nonzero integers. Alternatively, the invention may be described as a mirror having diffractive power produced by diffractive zones where a first group of zones has optical steps having heights such that a step will produce a relative phase shift equal to $2j\pi$ at the image point between two light rays of the design wavelength of the mirror emanating from a point source at the object point and striking the mirror immediately on opposite sides of the optical step. The mirror further has a group of zones having optical steps having heights such that a step will produce a relative phase shift of $2k\pi$ at the image point between two light rays of the design wavelength of the mirror emanating from a point source at the object point and striking the mirror immediately on opposite sides of the step. In this formulation, j and k are unequal nonzero integers.

DETAILED DESCRIPTION OF A PREFERRED EMBODIMENT

Diffractive reflectors typically use diffractive zones that are either linear or circular. Reflectors using linear or rectangular zones have focal characteristics similar to those of cylindrical mirrors. Diffractive reflectors utilizing concentric circular zones have focal characteristics similar to those of spherical mirrors. The present invention will be described in the context of such reflectors utilizing linear or circular zones. Those skilled in the art, however, will recognize that these zones could be elliptical or even of arbitrary shape. The effect of such other shapes is simply to cause the focal length to vary along different radii of the reflector.

When a diffractive reflector is designed, an object point and an image point must be preselected. The reflector will work only with maximum efficiency at those preselected points. This is in contrast to the operation of a conventional mirror where the image point simply moves as the object point is moved. It should be noted that within the invention, either the object distance, the distance to the object point, or the image distance could be set at infinity if so desired.

Figure 1:
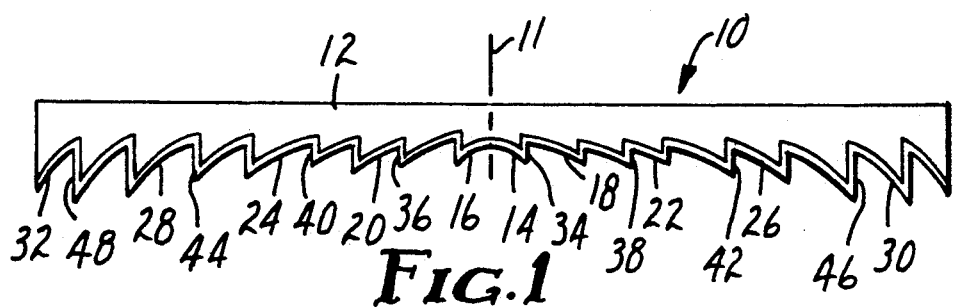
FIG. 1 is a first surface reflector according to the invention.

FIG. 1 shows a diffractive reflector, 10, according to the invention. Reflector 10 has an optical axis 11 and includes a substrate, 12, and a reflective layer 14. Substrate 12 could be made of a polymer material and injection molded. Alternatively it could be metallic with the diffraction pattern produced by lathe cutting. Reflective layer 14 is typically metallic and preferably of silver, gold, aluminum or copper. In general it will be understood that reflective layer 14 is specularly reflective.

The diffractive pattern includes a plurality of zones including central zone 16 and annular zones 18, 20, 22, 24, 26, 28, 30, and 32. The zones are separated by optical steps 34, 36, 38, 40, 42, 44, 46, and 48. The locations of steps 34, 36, 38, and 40 are given by the equations above. In those equations n would be equal to zero for zone 16, 1 for zone 18, 2 for zone 20, and 3 for zone 22. Zone 24, however, corresponds to two zones of a prior art reflector, i.e., the two zones having n equal to 4 and n equal to 5. It has the width of the sum of the width that those two zones would have if they were actually present and step 42 has a height equal to the sum of the step heights that would be associated with zones 4 and 5 of a prior art reflector. Since each of those would have typically had a step equal to half of the design wavelength, step 42 would be equal to the design wavelength. Zone 24 is, therefore, known as a superzone and is said to have a superzone number of 2. Similarly zone 26 has a superzone number of 2. Zones 28, 30 and 32 each correspond to three prior art zones. Therefore, steps 46 and 48 have a height of $3\lambda/2$. The structure shown in FIG. 1 is for illustration purposes only. In a typical real diffractive reflector, each group of zones or superzones would include more individual zones and the maximum superzone number would be greater than 3.

The invention, as illustrated in FIG. 1 and the succeeding figures, provides at least two major advantages over the prior art. First, since the structures are larger, they are easier to manufacture. Second, since there are fewer zones and thus fewer discontinuities in a reflector according to the invention than one of the prior art, scattering of light is greatly reduced.

In the examples above, it has been assumed that the step heights are exact half integral multiples of the design wavelength. This is because integral phase shift values are desired and the light traverses the distance of the step once prior to reflection and again subsequent to reflection. A more accurate way of stating the requirement is that steps 34, 36, 38, and 40 have a height such that two rays of light originating from a point source on the optical axis at the object point and striking reflector 10 immediately on opposite sides of one of those steps, will be phase shifted relative to one another by $2\pi$ at the image point. Similarly for two light rays emerging from a point source at the object point and striking reflector 10 immediately on opposite sides of steps 42 or 44 will be phase shifted relative to one another by $4\pi$ at the image point. The similar phase shift produced by steps 46 and 48 is $6\pi$.

Figure 2:
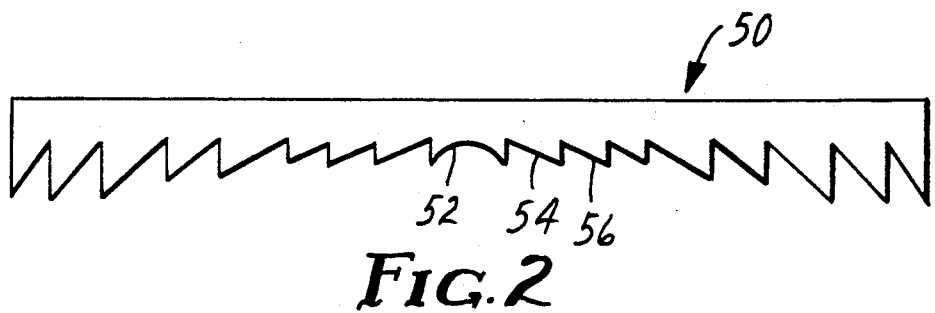
FIG. 2 is a first surface reflector according to the invention using a chord approximation in some of the zones.

FIG. 2 illustrates a reflector 50 that is functionally equivalent to the reflector of FIG. 1. There are two differences, however, between the reflector of FIG. 2 and that of FIG. 1. The reflector of FIG. 1 has a reflective coating 14 on a substrate 12 that need not be of a reflective material. The reflector of FIG. 2, however, is made of a reflective material so that no reflective coating is required. Lens 50 may be cut directly into any reflective machinable metal by high precision machining equipment such as a diamond turning machine. Preferred materials for a reflector such as reflector 50 include silver, gold, brass, and copper.

The second difference lies in the contour of the zones. The central zone 52 and the first annular zone, 54, are identical to central zone 16 and first annular zone 18 of reflector 10 of FIG. 1. Annular zone 56, and the remainder of the annular zones of reflector 50 of FIG. 2, however, use a chord approximation to the preferred curved profile. To understand this, it should be understood that the zones of FIG. 1 are generally spherical or cylindrical and of equal or nearly equal radius of curvature. As the zones become smaller, the chord connecting the two endpoints deviates less from the preferred curved surface. Therefore, if the deviation is sufficiently small, the chord approximation may be used without a significant loss of efficiency of the reflector. It is even possible in some circumstances to utilize the chord approximation in all of the zones including the central zone.

Figure 3:
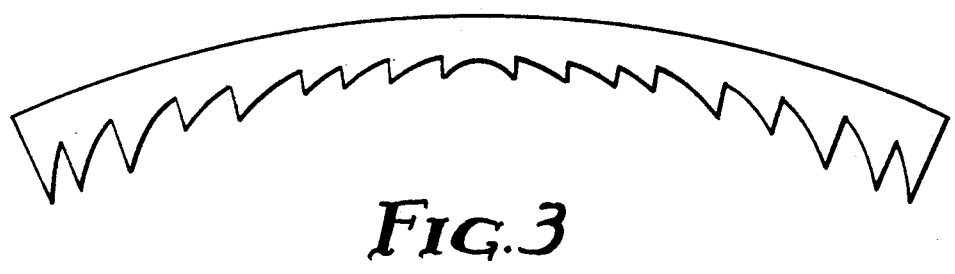
FIG. 3 is a first surface reflector according to the invention wherein a base curve adds conventional power to the diffractive power of the reflector.

FIG. 3 shows a diffractive reflector in which the diffractive structure has been combined with a base curvature. The profile of each zone in the reflector of FIG. 3 is equal to the algebraic sum of the profile that would exist without the base curve and the base curve itself. The power of the reflector of FIG. 3 is equal to the sum of the diffractive power and the conventional power that would be associated with the base curve.

Figure 4:
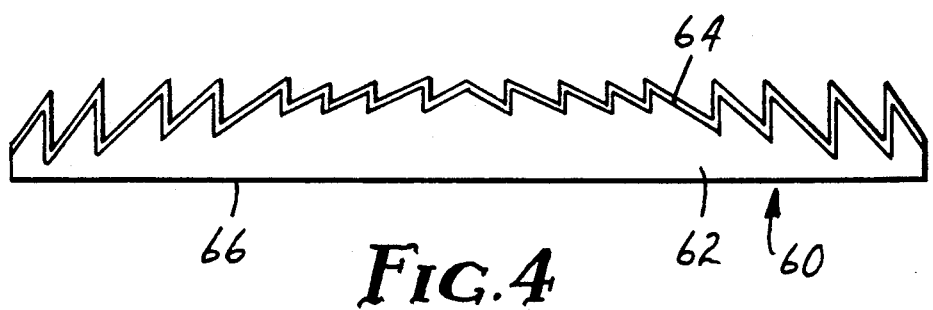
FIG. 4 is a second surface reflector according to the invention using a chord approximation in all of the zones.

FIG. 4 illustrates a superzone reflector 60 including a substrate 62 and a reflective coating 64. Substrate 62 is of a clear material such as glass or a polymer and reflector 64 is provided to make a second surface reflector. The design of reflector 60 must take into account the refractions that will occur as the light enters and leaves through surface 66 of substrate 62. The advantage of a reflector such as reflector 60 is that substrate 62 may be used to protect reflective coating 64 when the diffractive reflector is to be used in a harsh environment. All of the diffractive zones of reflector 60 use the chord approximation. An important consideration in designing a second surface diffractive reflector, such as reflector 60, is that the step heights are determined by the design wavelength in substrate 62.

Figure 5:
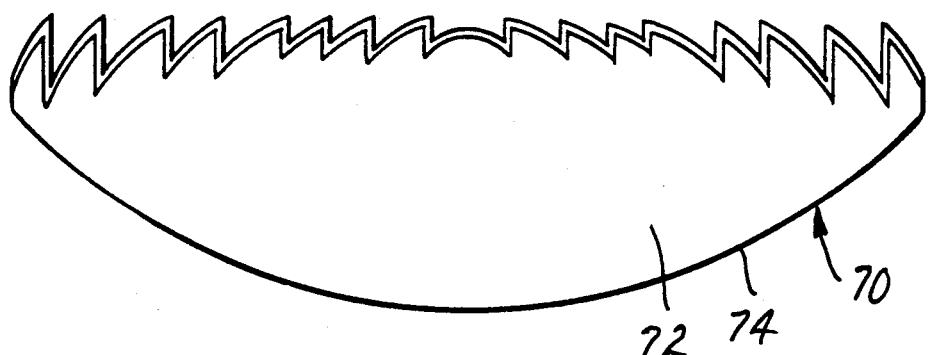
FIG. 5 is a second surface reflector according to the invention wherein the body of the reflector adds refractive power to the diffractive power of the reflector.

FIG. 5 illustrates a diffractive reflector, 70. Diffractive reflector 70 operates as a second surface reflector similar to diffractive reflector 60 of FIG. 4. In contrast to diffractive reflector 60, however, diffractive reflector 70 uses curved contours on its diffractive zones. In addition, substrate 72 of diffractive reflector 70 is provided with a curved first surface 74. The curvature of surface 74 provides a refractive power that adds to the diffractive power of the reflector. A possible use for a structure such as that shown in FIG. 5 is to produce an achromatic concentrator. This is possible because the chromatic aberration associated with the diffractive structure shown is opposite in sign to that associated with the refractive power of substrate 72. Thus the total chromatic aberration may be controlled to any desired value including zero.

It should be noted that all of the reflectors shown in FIGS. 1 through 5 will produce a focus associated with what is known by convention as the +1 diffractive order. If the zones were inverted, i.e., made convex instead of concave, the reflector would produce a focus associated with the −1 diffractive order. If there is no power other than the diffractive power, this would be a virtual image.

Figure 6:
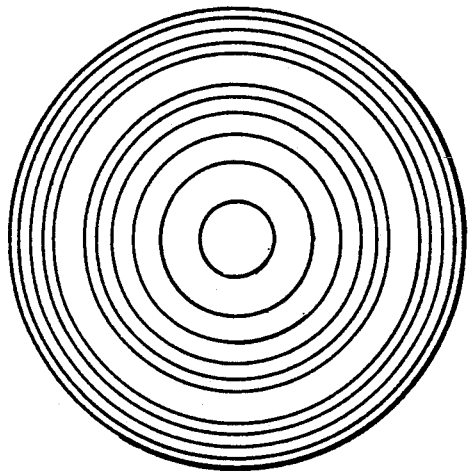
FIG. 6 is a front view of a reflector according to the invention having circular zones.
Figure 7:
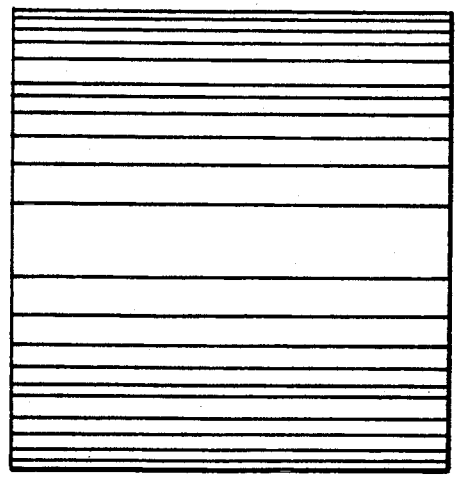
FIG. 7 is a front view of a reflector according to the invention having rectangular zones.

FIG. 6 is a front view of a diffractive reflector having circular zones. FIG. 7 is a front view of a diffractive reflector having linear or rectangular zones.

EXAMPLE

Figure 8:
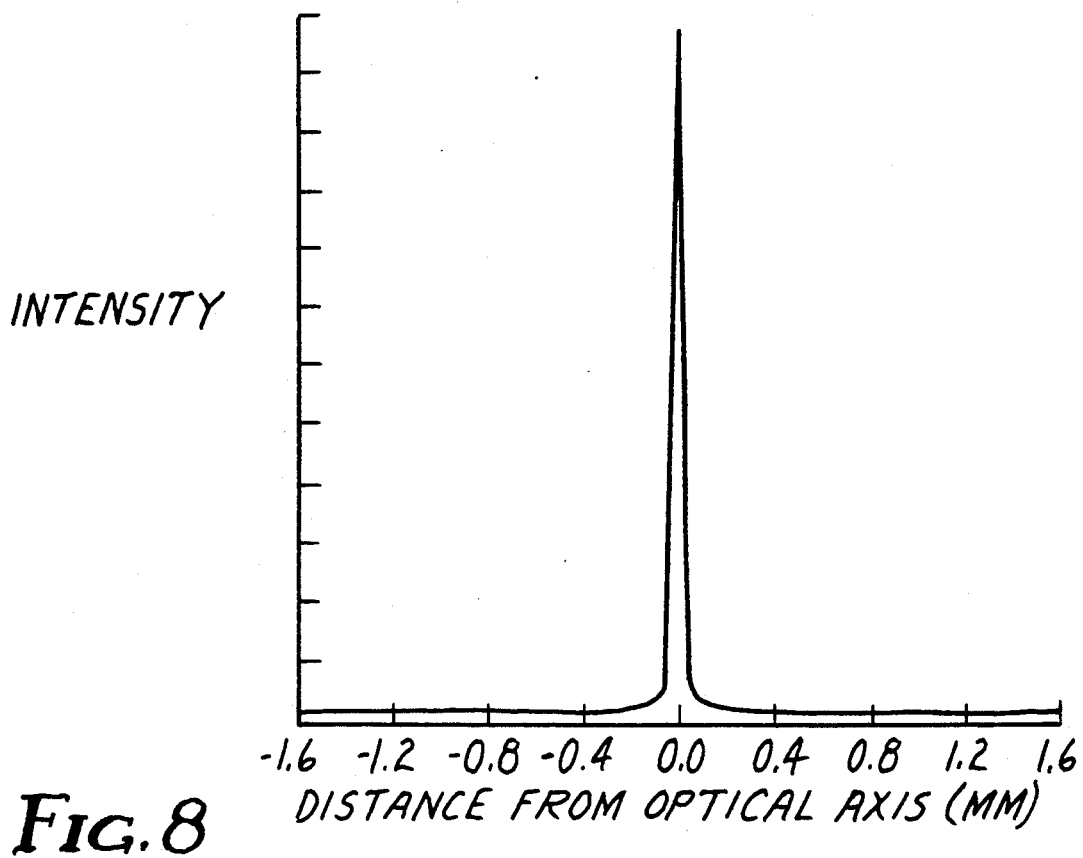
FIG. 8 is the point spread function of a reflector according to the invention at its image point.

A superzone mirror was cut in hard copper on a diamond turning machine. The mirror was designed to mimic the characteristics of a conventional spherical mirror having a radius of curvature of 200 mm. It was designed to operate with an infinite object distance and an image distance of 100 mm. The pattern was approximately five cm in diameter and included 449 zones. The outermost zone had a superzone number of 20. The design wavelength was 632.8 nm. FIG. 8 illustrates the measured point spread function of the lens at the image point.

Figure 9:
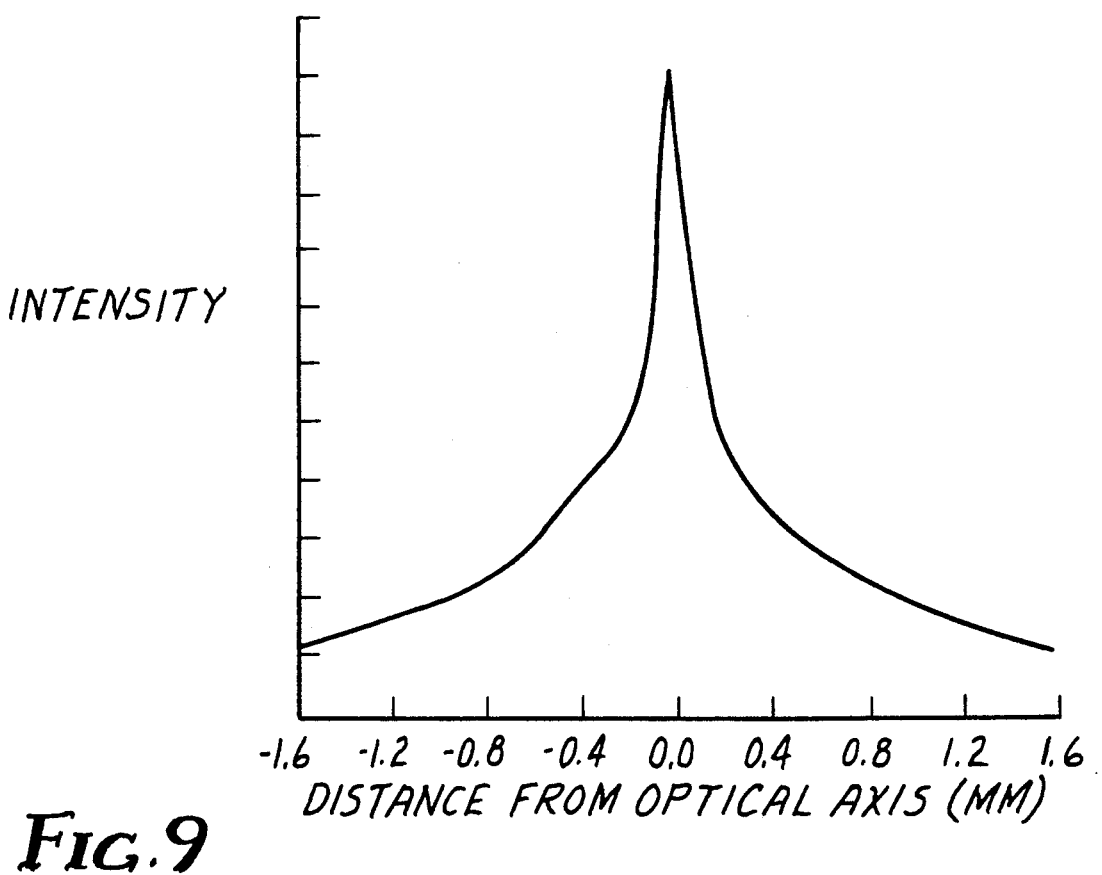
FIG. 9 is the point spread function of a conventional Fresnel reflector having the same focal length and aperture as the reflector of FIG. 8 at its image point.

For comparison a conventional Fresnel-type mirror with the same intended object and image distances, the same aperture, and the same number of zones was designed and manufactured. The conventional mirror utilized Fresnel zones that did not take into account the phase of the light. FIG. 9 illustrates the measured point spread function of the conventional lens at the image point. As may be seen by comparing FIGS. 8 and 9, the superzone diffractive reflector provides a much more precise focus than does the conventional mirror.

I claim:

1. A mirror having diffractive focusing power, said diffractive power being produced by a plurality of diffractive zones, said diffractive zones being terminated by optical steps, a first group of said diffractive zones having optical steps having heights equal to $j\lambda/2$ and a second group of said diffractive zones having optical steps having heights equal to $k\lambda/2$ where $\lambda$ is a design wavelength of light of the mirror and $j$ and $k$ are unequal nonzero integers.

2. The mirror according to claim 1 wherein said mirror has an optic axis passing through a first diffractive zone and said first group of diffractive zones is adjacent said first zone and said second group of diffractive zones are separated from said first zone by said first group of zones, said zones of said first group having optical steps having heights equal to $\lambda/2$ and said zones of said second group having optical steps having heights equal to $\lambda$.

3. The mirror according to claim 2 wherein said zones are circular and concentric.

4. The mirror according to claim 2 wherein said zones are rectangular.

5. The mirror according to claim 2 further comprising a third group of diffractive zones separated from said first zone by said first and second groups of zones, said zones of said third group having optical steps having heights equal to $3\lambda/2$.

6. The mirror according to claim 5 wherein said zones are circular and concentric.

7. The mirror according to claim 5 wherein said zones are rectangular.

8. The mirror according to claim 1 wherein said zones have circular contours.

9. The mirror according to claim 8 wherein said mirror has an optic axis passing through a first diffractive zone and said first group of diffractive zones is adjacent said first zone and said second group of diffractive zones are separated from said first zone by said first group of zones, said zones of said first group having optical steps having heights equal to $\lambda/2$ and said zones of said second group having optical steps having heights equal to $\lambda$.

10. The mirror according to claim 9 further comprising a third group of diffractive zones separated from said first zone by said first and second groups of zones, said zones of said third group having optical steps having heights equal to $3\lambda/2$.

11. The mirror according to claim 1 wherein said zones have linear contours.

12. The mirror according to claim 11 wherein said mirror has an optic axis passing through a first diffractive zone and said first group of diffractive zones is adjacent said first zone and said second group of diffractive zones are separated from said first zone by said first group of zones, said zones of said first group having optical steps having heights equal to $\lambda/2$ and said zones of said second group having optical steps having heights equal to $\lambda$.

13. The mirror according to claim 12 further comprising a third group of diffractive zones separated from said first zone by said first and second groups of zones, said zones of said third group having optical steps having heights equal to $3\lambda/2$.

14. The mirror of claim 1 wherein said mirror is a first surface reflector.

15. The mirror of claim 14 wherein said mirror includes a polymeric body with a reflective metal coated thereon.

16. The mirror of claim 14 wherein said mirror includes a body of a reflective metal.

17. The mirror of claim 16 wherein said reflective metal is copper.

18. The mirror of claim 1 wherein said mirror is a second surface reflector.

19. The mirror of claim 18 wherein said mirror has a body that provides refractive power.

20. The mirror of claim 18 wherein said mirror includes a transparent body of a polymeric material with a reflective metal coated thereon.

21. A mirror having diffractive power, and object and image points at object and image distances from said mirror respectively, said diffractive power being produced by a plurality of diffractive zones, a first group of said diffractive zones having optical steps with heights selected such that a relative phase shift of $2j\pi$ at said image point will be introduced between two light rays of a design wavelength emanating from a point source at said object point and striking said mirror immediately on opposite sides of one of said optical steps of said first group and a second group of said diffractive zones having optical steps with heights selected such that a relative phase shift of $2k\pi$ at said image point will be introduced between two rays of light of said design wavelength emanating from a point source at said object point and striking said mirror immediately on opposite sides of one of said optical steps of said second group, where j and k are unequal nonzero integers.

22. The mirror according to claim 21 wherein said mirror has a first zone and an optical axis passing through said first zone, said first group of zones being adjacent said first zone and said second group of zones being separated from said first zone by said first group of zones, and j is equal to one and k is equal to two.

23. The mirror according to claim 22 wherein said zones are circular and concentric.

24. The mirror according to claim 22 wherein said zones are rectangular.

25. The mirror according to claim 21 further comprising a third group of diffractive zones, said third group being separated from said first zone by said first and second groups of zones, said zones of said third group having optical steps with heights such that a relative phase shift of $6\pi$ will be introduced at said image point between two rays of light of said design wavelength emanating from a point source at said object point and striking said mirror immediately on opposite sides of one of said optical steps of said third group.

26. The mirror according to claim 21 wherein said zones have circular contours.

27. The mirror according to claim 21 wherein said zones have linear contours.

28. The mirror of claim 21 wherein said object and image distances are both finite.

29. The mirror of claim 21 wherein said object distance is infinite.

30. The mirror of claim 21 wherein said image distance is infinite.

31. The mirror of claim 21 wherein said mirror is a first surface reflector.

32. The mirror of claim 31 wherein said mirror includes a polymeric body with a reflective metal coated thereon.

33. The mirror of claim 31 wherein said mirror includes a body of a reflective metal.

34. The mirror of claim 33 wherein said reflective metal is copper.

35. The mirror of claim 21 wherein said mirror is a second surface reflector.

36. The mirror of claim 35 wherein said mirror has a body that provides refractive power.

37. The mirror of claim 35 wherein said mirror includes a transparent body of a polymeric material with a reflective metal coated thereon.

38. A mirror having diffractive power, an object point and an image point, said diffractive power being produced by a plurality of diffractive zones, a first of said diffractive zones having an optical step with a height selected such that a relative phase shift of $2j\pi$ at said image point will be introduced between two light rays of a design wavelength emanating from a point source at said object point and striking said mirror immediately on opposite sides of said optical step of said first zone and a second of said diffractive zones having an optical step with a height selected such that a relative phase shift of $2k\pi$ at said image point will be introduced between two rays of light of said design wavelength emanating from a point source at said object point and striking said mirror immediately on opposite sides of said optical step of said second zone, where j and k are unequal nonzero integers.

* * * * *